United States Patent [19]

Nihei et al.

[11] Patent Number: 5,508,686
[45] Date of Patent: Apr. 16, 1996

[54] OVERTRAVEL DETECTING DEVICE FOR AN INDUSTRIAL ROBOT

[75] Inventors: Ryo Nihei, Fujiyoshida; Kazuhisa Otsuka; Hideki Sugiyama, both of Minamitsuru, all of Japan

[73] Assignee: Fanuc Ltd., Yamanashi, Japan

[21] Appl. No.: 351,311

[22] PCT Filed: Apr. 15, 1994

[86] PCT No.: PCT/JP94/00633

§ 371 Date: Dec. 14, 1994

§ 102(e) Date: Dec. 14, 1994

[87] PCT Pub. No.: WO94/23910

PCT Pub. Date: Oct. 27, 1994

[30] Foreign Application Priority Data

Apr. 16, 1993 [JP] Japan ................................ 5-090009

[51] Int. Cl.[6] ................................................. G08B 31/00
[52] U.S. Cl. ........................ 340/686; 340/679; 901/13
[58] Field of Search ............................ 901/13; 340/686, 340/679

[56] References Cited

FOREIGN PATENT DOCUMENTS

| | | |
|---|---|---|
| 59-171087 | 11/1984 | Japan . |
| 62-11587 | 1/1987 | Japan . |
| 62-25321 | 2/1987 | Japan . |
| 62-106020 | 7/1987 | Japan . |
| 62-153436 | 9/1987 | Japan . |
| 2-51092 | 4/1990 | Japan . |

*Primary Examiner*—Glen Swann
*Attorney, Agent, or Firm*—Nikaido, Marmelstein, Murray & Oram

[57] ABSTRACT

An overtravel detecting device, mounted on an angularly movable shaft of an industrial robot for mechanically determining and detecting the limits of rotation of the movable shaft, is attached to a rotating shaft (12) of a wrist portion (10) of an industrial robot and is provided with a pattern plate member (22) having two grooved paths (24) for setting the limits of rotation of the rotating shaft at predetermined position with respect to an origin position of the rotation, and a detecting element constituted by a limit switch (32) for transmitting an overtravel signal when the switch comes into contact with stop walls (24a, 24b) formed at ends of the two grooved paths for setting limits of rotation.

7 Claims, 5 Drawing Sheets

Fig. 5

OVERTRAVEL DETECTING DEVICE FOR AN INDUSTRIAL ROBOT

TECHNICAL FIELD

The present invention relates to an overtravel detecting device for an industrial robot. More particularly, it relates to an overtravel detecting device, for an industrial robot, which can determine and detect limit positions during a rotation of the robot about an axis of rotation, and permits setting of a limit to the rotating motion of the robot which is more than 360 degrees.

PRIOR ART

In industrial robots, especially in a multi-articulated industrial robot, movable elements thereof are allowed to perform respective rotating motions about a plurality of axes, and accordingly, a foremost movable element of the robot, e.g., a robot end effector such as a robot hand, is made to perform a desired amount of motion by rotating several movable elements.

In the multi-articulated industrial robot, the rotating motion of each movable element about its own axis or articulation is usually driven by a drive source comprised of an electric motor. The rotating motion performed by each movable element of the robot about its own axis in the clockwise and the counterclockwise directions is limited to a predetermined angle to prevent the robot from being excessively moved so as to ensure the safety of an operator and to avoiding mechanical interference between the robot and equipment installed near the robot to thereby prevent the robot or the equipment being damaged.

One method conventionally used to prevent the robot moving excessively is to provide an overtravel detecting device on each articulation axis of the robot so as to limit the motion of each movable element around its own articulation axis.

One of the conventionally used overtravel detecting devices is constituted by mechanical dogs attached to each movable (rotatable) element of the robot, and a detecting unit such as well known limit switches and proximity switches attached to a stationary element of the robot confronting the movable element. The overtravel detecting device operates in such a manner that the detecting unit is actuated by the mechanical dogs when the movable element of the robot is moved through a predetermined motion range with respect to the stationary element, and a signal indicating the limit of motion of the movable element is transmitted by the detecting unit.

Another conventional overtravel detecting means is constituted by an encoder unit incorporated in a drive motor for each movable element comprised of a servo motor. The encoder unit constantly detects the amount of rotation of the movable element, and transmits a signal, to a robot control unit, as a feedback signal which the control unit uses to detect overtravel of the movable element.

Nevertheless, in the former conventional overtravel detecting means using mechanical dogs and a detecting unit for detecting the limit of rotation of a movable element of the robot about an axis of rotation, since the dogs are arranged so as to be brought into physical contact with the detecting unit to detect the limit of rotation, the dogs and the detecting unit must be arranged in a common plane extending perpendicularly to the axis of rotation of the movable element.

As a result, when a detecting actuator of the detecting unit is arranged at an origin position of the rotation of a movable element, only two dogs can be used and must be arranged at two positions distant less than 180 degrees in the clockwise and counterclockwise directions from the origin position of the rotation, respectively. Namely, if one of the dogs is arranged so as to detect a limit of rotation of a movable element from the origin position in one of the clockwise and the counterclockwise directions, which is larger than 180 degrees, the dog becomes in contact with the detecting unit when the movable element rotates less than 180 degrees in the other of the clockwise and the counterclockwise directions. Thus, the other dog must be arranged so as to detect a limit of rotation of the movable element from the origin position, which is obviously less than 180 degrees. Thus, there occurs such a defect that the limits of rotation of a movable element in clockwise and counterclockwise directions are unequal.

Further, if both limits of rotation of a movable element in clockwise and counterclockwise directions are set at 180 degrees from the origin position, i.e., at an exact one half of a complete rotation, the respective two dogs must be arranged at one identical positions. Nevertheless, it is apparent that the two dogs cannot be arranged at the identical positions. Accordingly, it is impossible to set and detect limits of rotation set at exactly 180 degrees in both the clockwise and counterclockwise positions from the origin position.

To this end, in an industrial robot, and particularly in a multi-articulated type industrial robot, the abovementioned overtravel detecting device comprised of a combination of mechanical dogs and a detecting unit including a limit switch has been used for detecting a small limit of rotation of a movable element, i.e., a robot base, and a robot arm which rotates about one of three basic articulations of the multi-articulated type industrial robot. However, the abovementioned overtravel detecting device cannot be employed for detecting the limit of rotation of a robot wrist which is required to have an extended freedom of movement in three orthogonal axes of rotation.

On the other hand, the latter overtravel detecting device, comprised of encoders for detecting the limits of rotation of a rotating element of an industrial robot about each of the three articulation axes, increases the cost of the robot.

Further, many users of industrial robots prefer to employ a method of detecting a limit of rotation of a movable element of the industrial robot, i.e., an overtravel of the movable element, by the use of mechanical dogs and a detecting unit including a limit switch and a proximity switch. In this case, the use of the overtravel detecting device comprised of the abovementioned mechanical dog and the detecting unit must suffer such a defect that a limit of rotation of the movable element of the robot must be less than 180 degrees in both clockwise and counterclockwise directions. This results in making it difficult for the robot to exhibit sufficient freedom of movement.

DISCLOSURE OF THE INVENTION

An object of the present invention is to provide an overtravel detecting device for an industrial robot, by which it is possible to mechanically determine and detect a limit of rotation of a movable element of the robot, and additionally to detect a limit of rotation of the movable element about its axis of rotation which is equal to or larger than 360 degrees.

In order to achieve the above-mentioned object, the present invention provides an overtravel detecting device capable of mechanically determining and detecting a limit of rotation of each rotating element of a robot rotatable about its own axis of rotation, the detecting device being provided with:

a mechanical element defining a grooved path extending spirally about the axis of rotation of each movable element, and setting two spaced ends of the path as mechanical limiting ends of the movable element; and, a detecting device including a detecting element arranged at a position along the above-mentioned path in such a manner that it is able to rotate with the rotating element of the robot, and transmitting a detecting signal indicating a limit of rotation when the detecting element is in contact with one of the two spaced ends of the spirally extending path. The two spaced ends of the spirally extending path may be set at two positions spaced apart from one another more than 360 degrees about the axis of rotation of the rotatable element, and accordingly, the limit of rotation of the rotatable element of the robot may be more than 360 degrees.

In accordance with the present invention, there is provided an overtravel detecting device for detecting a limit of rotation of an industrial robot about an axis of rotation, which is characterized by comprising:

an overtravel detected or indicating means attached to a shaft body having the axis of rotation thereof, and being able to determine and indicate detectable ends at predetermined positions about said axis of rotation; and a detecting means arranged at a predetermined position around the shaft body, and provided with a detecting end suitable for coming into contact with the detectable ends of the overtravel indicating means, said detecting means transmitting an overtravel signal when it detects the limit of rotation;

said overtravel indicating means including a single pattern plate member and being provided with two grooved paths substantially circumferentially extending around the axis of rotation of the shaft body so as to have a predetermined length and having stop wall portions, each arranged at an end of each of said two grooved paths so as to function as said detectable end, said pattern plate member of said overtravel indicating means being integrally rotated with the shaft body to thereby permit the detecting end of said detecting means to be relatively rotated toward the detectable ends of the grooved paths.

The above-mentioned overtravel detecting device for an industrial robot is able to transmit an overtravel detected signal in response to a mechanical contact between the detectable end of the overtravel indicating means with the detecting end of said overtravel detecting means. Further, the two grooved paths of the overtravel indicating means can form spirally extending paths having stop walls at the ends thereof, which are angularly spaced apart more than 360 degrees from one another, and accordingly, the overtravel detecting device can be a mechanical overtravel detecting device capable of determining and detecting limits of rotation about a single axis of rotation through more than 180 degrees in both the clockwise and the counterclockwise directions. Preferably, the pattern plate member of the above-mentioned overtravel indicating means is formed of a cut-plate member cut out of a single circular plate so as to have a central bore portion thereof in which the shaft body is inserted, and the grooved paths extending spirally around the central bore portion and defining two path ends as the detectable ends. Thus, the cut-plate member has only a portion defining the grooved paths and as a result, the cut-plate member can be very light in weight and can be easily attached to a desired shaft body in an industrial robot.

BRIEF DESCRIPTION OF THE DRAWINGS

The above and other objects, features and advantages of the present invention will be made more apparent from the ensuing description of a preferred embodiment thereof in conjunction with the accompanying drawings wherein.

BEST MODE OF CARRYING OUT THE INVENTION

Figure 1:
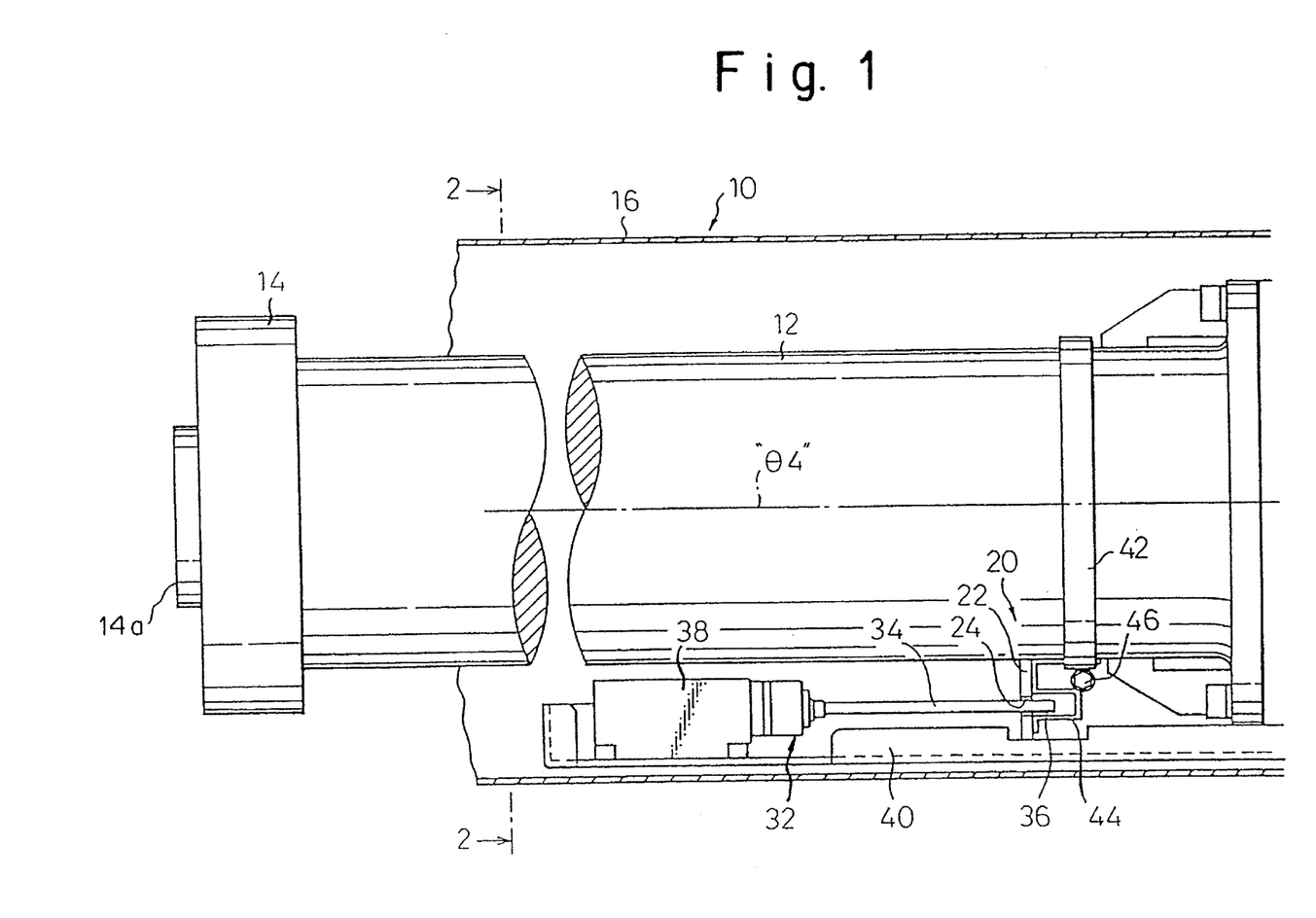
FIG. 1 is a partial side view of a wrist portion of an industrial robot to which an overtravel detecting device according to an embodiment of the present invention is attached, illustrating the construction and arrangement of the overtravel detecting device.

Referring to FIG. 1, an overtravel detecting device for determining and detecting the limits of rotation of a shaft of a wrist portion attached to an extremity of an arm of an industrial robot is illustrated.

The wrist portion 10 is provided with a rotating shaft 12 formed as a shaft body rotatable about an axis "θ4" of rotation, and has a wrist flange 14 at an extreme end thereof, and the wrist flange has a front end 14a to which an end effector (not shown) such as a robot hand is attached.

The rotating shaft 12 of the wrist portion 10 is provided with an appropriate axial position thereof at which a cut-plate member 22 (hereinafter referred to as a pattern plate member) forming an indicating element indispensable for constituting an overtravel detecting device 20 according to the present invention is attached. The pattern plate member 22 is attached to an appropriate support member such as a metallic support 44 by an appropriate mounting means such as mounting screws, and the metallic support 44 is rigidly fixed to the outer circumference of the rotating shaft 12 by a band member known as a belt clamp 42.

The belt clamp 42 is provided with a metal clamp screw 46 which can be rotated so as to tighten or loosen the belt cramp 42 around the outer circumference of the shaft.

The above-mentioned pattern plate member 22 is formed as a single plate member having a later-described spirally extending grooved path 24, and a stop wall arranged at an end of the spirally extending path 24 is provided as an indicating or detectable end of the overtravel detecting device 20.

On the other hand, the pattern plate member 22 constituting the indicating or detected element cooperates with a limit switch 32 forming a detecting element of the overtravel detecting device. The limit switch is fixedly arranged at a predetermined stationary position with respect to the rotating direction of the rotating shaft 12. The limit switch 32 is provided with an axially extending detecting probe 34, a fore end of which is formed as a detecting end 36 capable of engageably projecting into or being in contact with the grooved path 24 of the pattern plate member 22. The axially opposite end of the detecting probe 34 is attached to a detector portion 38 from which a detecting signal is transmitted. The limit switch 40 is mounted on and held by a mounting bracket 40 formed as a metallic member, and is fixed to a robot arm via the mounting bracket 40 at a position adjacent to a base end of the rotating shaft 12 so that it is always held stationary irrespective of the rotation of the rotating shaft 12.

In accordance with the present invention, the detecting probe 34 of the limit switch 32 has an elastic shaft made of a wire spring or a coil spring, which can be freely moved in many ways in a space, and functions as an actuator capable of actuating the detector portion 38 when the elastic shaft is moved more than a predetermined amount. It should be understood that the limit switch 32 having a detecting probe 34 made of an elastic shaft can be easily obtained and is used for many practical applications.

The overtravel detecting device 20 provided with a detecting and indicating elements constituted by the above-mentioned pattern plate member 22 and the limit switch 32, is able to mechanically determine and detect the overtravel of the rotating shaft 12, and is preferably housed inside a cover 16 covering the rotating shaft 12 so that the device 20 is prevented from mechanically interfering with external equipment.

Figure 2:
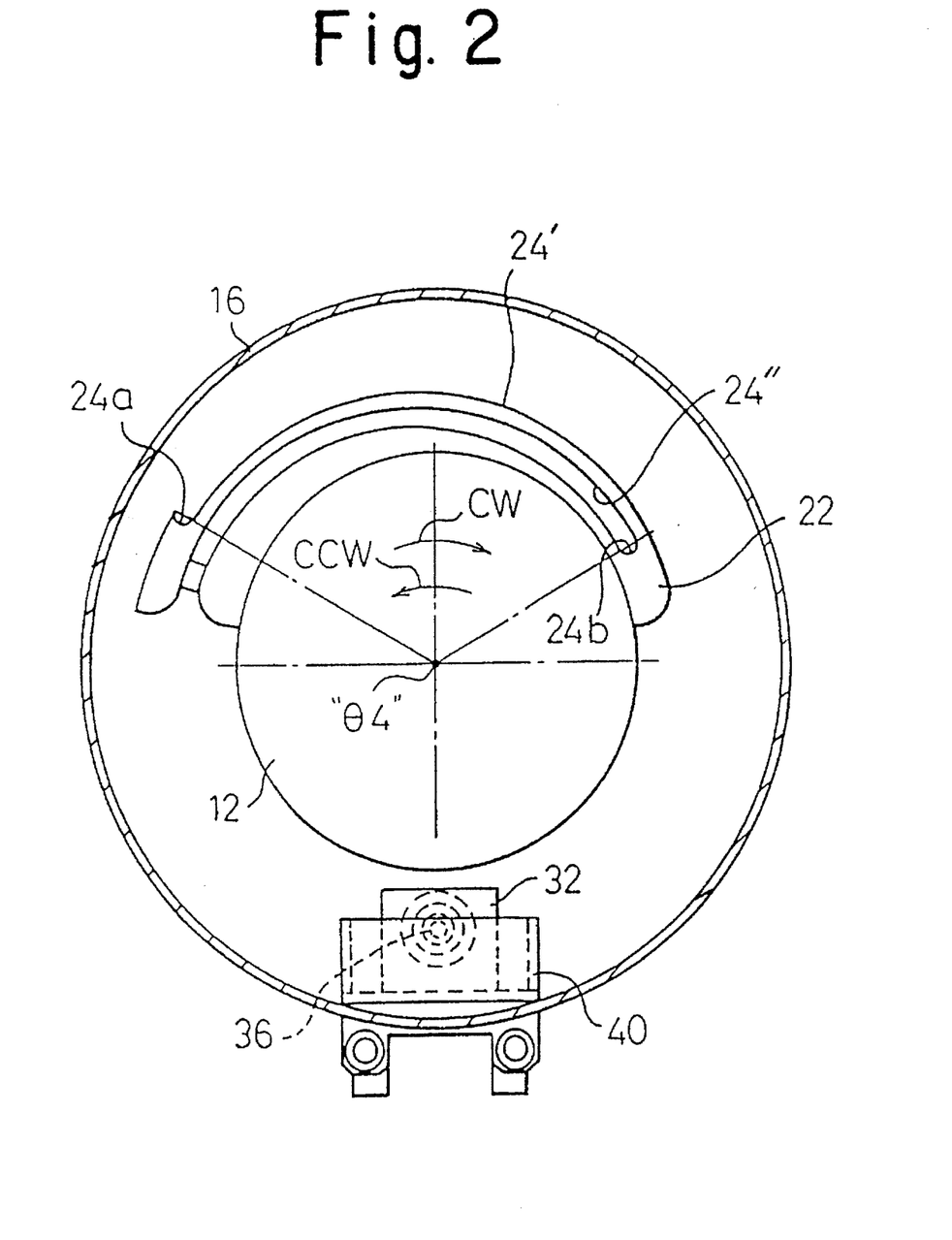
FIG. 2 is a cross-sectional view taken along the line 2—2 of FIG. 1.

Referring now to FIG. 2, the arrangement of the overtravel detecting device according to the present embodiment is shown, in which a limit switch 32 forming a detecting element is fixedly arranged at a position confronting an origin position of the rotation of the rotating element 12, about the axis "θ4" of rotation, in the clockwise and the counterclockwise directions. Further, the pattern plate member 22 forming the indicating element is attached to the outer circumference of the rotating shaft 12, and defines two radially spaced inner and outer grooved paths 24' and 24" (the two grooved paths are two portions of a path 24 extending along a single spiral line), and has two stop walls 24a and 24b at respective ends of the two grooved paths.

In FIG. 2, since the limit switch 32 is arranged at a stationary position confronting the origin position from which the limit of rotation of the above-mentioned rotating shaft 12 must be detected, when the rotating shaft 12 rotates about the axis "θ4" of the rotation in a clockwise direction (CW), the pattern plate member 22 gradually approaches the detecting end 36 of the detecting probe 34 of the limit switch 32 until the outer grooved path 24' of the pattern plate 22 comes into contact with the detecting end 36. When the rotating shaft 12 further rotates in the right-hand direction, the stop wall 24a of the path will eventually come into contact with the detecting end 36. When the rotating shaft 12 further rotates from the contacting state of the detecting end 36 and the stop wall 24a, the detecting probe 34 is moved to a position for transmitting an overtravel detected signal. Namely, the stop wall 24a of the pattern plate member 22 defines a limit of rotation of the rotating shaft 12 in the clockwise direction, and forms the detectable end detected by the limit switch 32.

When the rotating shaft 12 rotates in the opposite counterclockwise (CCW), direction about the axis "θ4" of rotation from the above-mentioned contacting position of the detecting end 36 and the stop wall 24a of the grooved path, the pattern plate 22 gradually approaches the detecting end 36 of the detecting probe 34 of the limit switch from the direction opposite to the above-mentioned direction until the detecting end 36 comes into contact with the inner grooved path 24" of the pattern plate member 22. When the rotating shaft 12 further rotates, the detecting end 36 relatively moves along the inner path 24", and eventually comes into contact with the stop wall 24b at the end of the grooved path 24. As soon as the detecting end 36 is sufficiently moved by the stop wall 24b of the inner grooved path 24", the detector portion 38 transmits an overtravel signal in response to the movement of the detecting probe 34.

From the foregoing description, it will be understood that the overtravel detecting device of the present embodiment is able to mechanically determine and detect overtravel of the rotating shaft 12 of the wrist portion, i.e., the limits of rotation of the rotating shaft 12. Moreover, since the inner and outer grooved paths 24", 24' are formed as parts of a single spirally extending grooved path 24, the limits of rotation of the rotating shaft to be detected by the overtravel detecting device can be set at angular positions beyond 180 degrees from the origin position of rotation of the shaft 12, i.e., the position where the detecting element (the limit switch 32) is fixedly arranged, in both the clockwise and the counterclockwise directions.

Figure 3A:
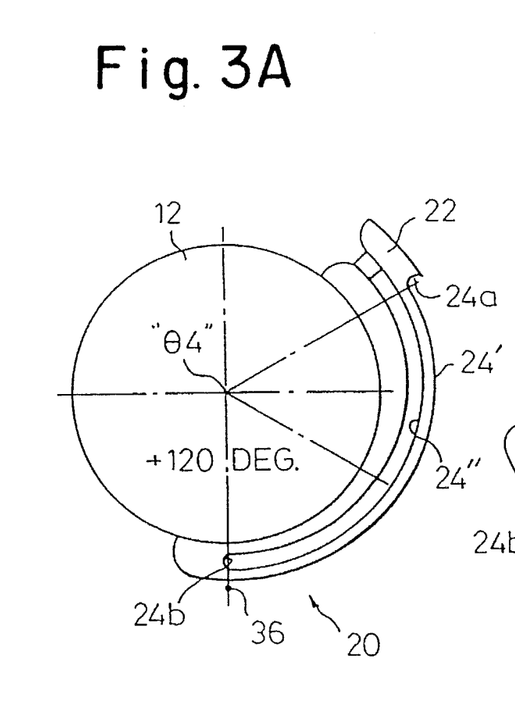
FIG. 3A is a schematic cross-sectional view of the overtravel detecting device of the embodiment, illustrating the relationship between a detecting element and an indicating or detected element when a rotating element of the robot is rotated through 120 degrees about its own axis of rotation with respect to an origin position.
Figure 3B:
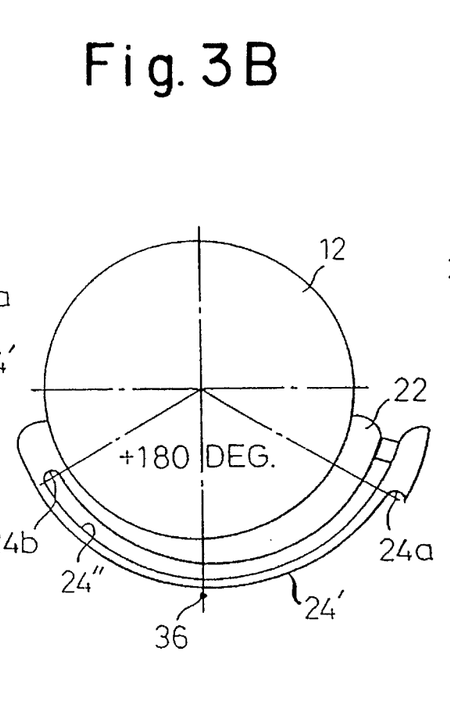
FIG. 3B is a schematic cross-sectional view, illustrating the relationship between the detecting and indicating (detected) elements when the rotating element is rotated through 180 degrees with respect to the same origin position.
Figure 3C:
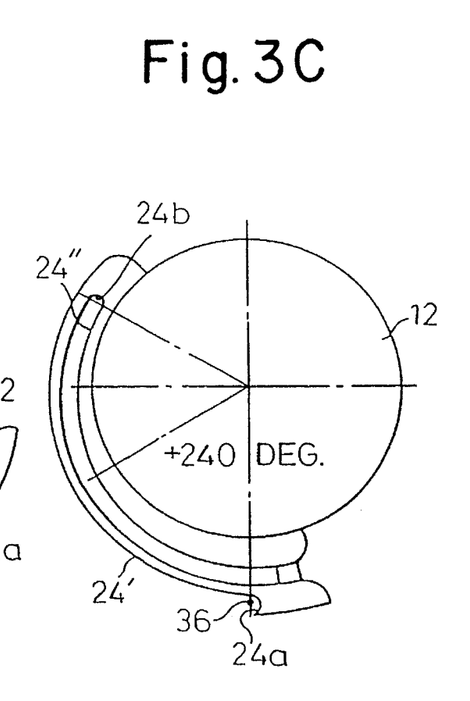
FIG. 3C is a like schematic cross-sectional view, illustrating the relationship between the detecting and indicating elements when the rotating element is rotated through 240 degrees with respect to the same origin position.

At this stage, referring to FIGS. 3A through 3C, FIG. 3A illustrates a state where the rotating shaft 12 has rotated, through 120 degrees from the origin position of rotation thereof (FIG. 2) in the clockwise direction, with respect to the limit switch 32 forming the detecting element of the overtravel detecting device, and where the detecting end 36 comes into contact with the outer grooved path 24' of the pattern plate member 22. FIG. 3B illustrates another state where the rotating shaft 12 has rotated through 180 degrees from the origin position in clockwise direction (CW), and during the rotation of the rotating shaft 12, the outer grooved path 24' of the pattern plate member is kept in contact with the detecting end 36. FIG. 3C illustrates a further state where the rotating shaft 12 has rotated through 240 degrees from the origin position of rotation of the rotating shaft 12 in the CW direction, and where the detecting end 36 of the limit switch 32 has been brought into contact with the stop wall 24a of the outer grooved path 24' of the pattern plate 22 to thereby detect a limit position indicating an overtravel of the rotating shaft 12.

Figure 4A:
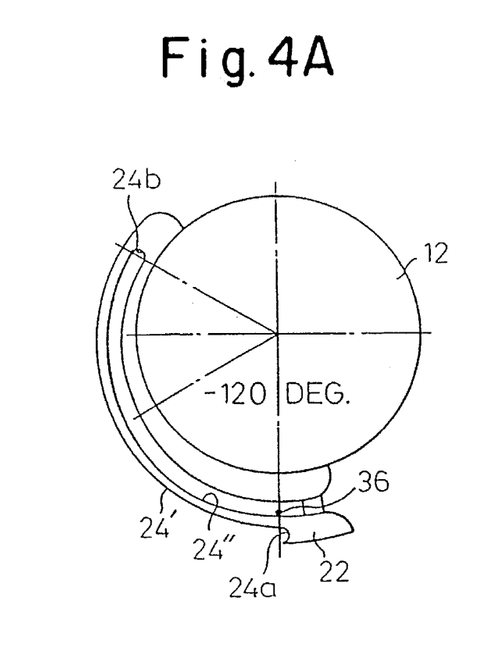
FIG. 4A is a schematic cross-sectional view of the overtravel detecting device of the embodiment identical to that of FIGS. 3A through 3C, illustrating the relationship between the detecting and indicating elements of the device when the rotating element of the robot is rotated, in the reverse direction, through −120 degrees with respect to the origin position.
Figure 4B:
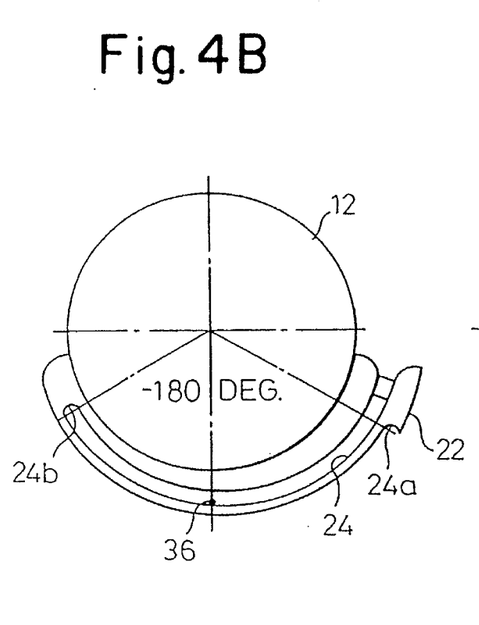
FIG. 4B is a schematic cross-sectional view, illustrating the relationship between the detecting and indicating elements when the rotating element is rotated through −180 degrees with respect to the same origin position.
Figure 4C:
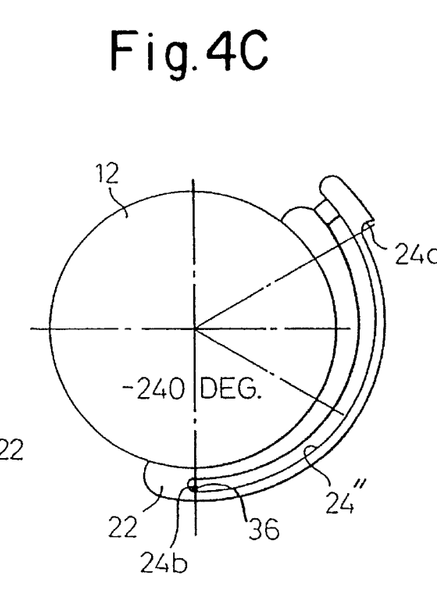
FIG. 4C is a schematic cross-sectional view, illustrating the relationship between the detecting and indicating elements when rotated through −240 degrees with respect to the same origin position.

Referring to FIGS. 4A through 4C, FIG. 4A illustrates the state where the rotating shaft 12 has rotated through 120 degrees (−120 degrees), from the origin position of rotation thereof in the counterclockwise direction (CCW), with respect to the detecting end 36 of the limit switch 32 forming the detecting element of the overtravel detecting device, and where the detecting end 36 comes into contact with the inner grooved path 24" of the pattern plate member 22. FIG. 4B illustrates the state where the rotating shaft 12 has rotated through 180 degrees in the CCW direction while maintaining contact between the grooved path 24 and the detecting end 36 of the limit switch. FIG. 4C further illustrates a state where the rotating shaft 12 has rotated through 240 degrees, from the origin position of rotation of the rotating shaft 12 in the CCW direction, and where the detecting end 36 of the limit switch 32 has been brought into contact with the stop wall 24b of the inner grooved path 24" of the pattern plate 22 to thereby detect a different limit position indicating overtravel of the rotating shaft 12 in the CCW direction.

With the above-mentioned construction and the arrangement of the overtravel detecting device 20, the device can determine and detect the limits of rotation of a rotating element at 240 degrees from the origin position of the rotating element in both the clockwise and the counterclockwise directions. Therefore, the limit of rotation of the rotating element can be set at 480 degrees about the axis of rotation by using the pattern plate member 22 defining the inner and outer grooved paths 24", 24', and the detection of the respective limits of rotation of the rotating element, i.e., the mechanical detection of the overtravel of the rotating element can be achieved with certainty.

The overtravel signal, indicating the overtravel of the rotating element, transmitted from the detector portion 38 of the limit switch 32 forming the detecting element is sent to a robot controller (not shown) which receives the overtravel detected signals in the same manner as the conventional alarm signals, and operates so as to immediately stop the rotation of the rotating shaft 12 of the industrial robot. It should be understood that the operation of the robot controller is performed in the same manner with regard to both the clockwise and counterclockwise directions.

The limit switch 32 forming the detecting element is provided with an elastic shaft-like probe 34, and therefore, during rotation of the rotating shaft 12 through total of 480 degrees in the right-hand and left-hand directions, the probe 34 can elastically move so as to maintain a constant contact with the spiral grooved path 24 of the pattern plate member 22, and therefore, an error in detection of overtravel of the rotating shaft does not occur.

Figure 5:
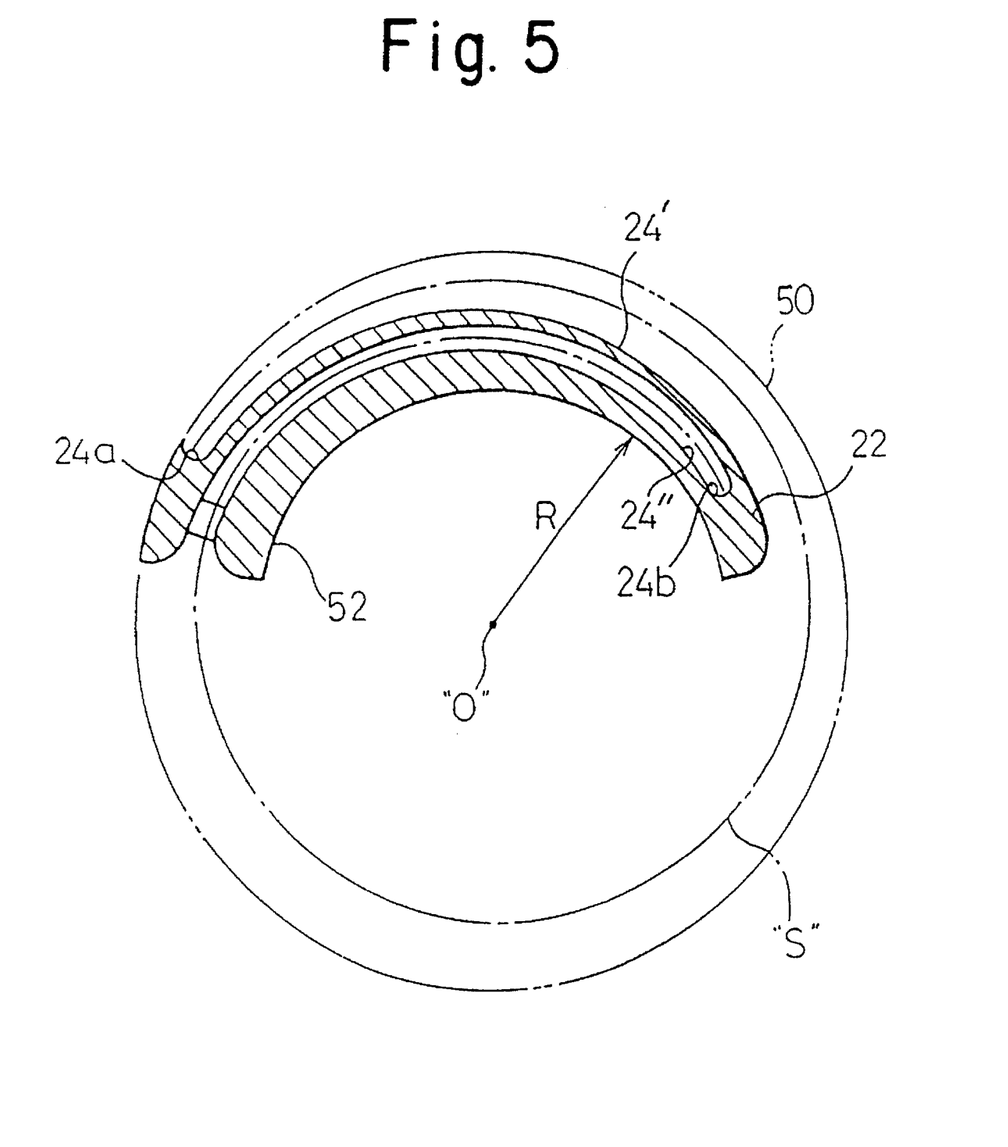
FIG. 5 is a schematic view of a pattern plate member, illustrating a method of forming the pattern plate member by which the indicating element is constituted.

Referring to FIG. 5, the pattern plate member 22 is a single member cut out of a circular piece of plate 50 made of metallic or plastic plate material having an appropriate thickness, and is provided with an inner edge 52 formed so as to extend along a partial circle having a radius "R" corresponding to the radius of the rotating shaft 12 on which the pattern plate member 22 is mounted. The pattern plate member 22 is formed with the aforementioned inner and outer grooved paths 24" and 24' extending along a common spiral line "S", and is provided with stop walls 24a and 24b at the ends of the spiral grooved path 24, so that the detecting end 36 (FIG. 1) of the detecting element is brought into contact with the stop walls 24a and 24b, respectively. The pattern plate member 22 may be cut out of a rectangular-shape plate material instead of the circular plate 50, as required. It should be understood that since the pattern plate member 22 is made of a low cost plate material by cutting, the pattern plate member 22 per se can be an element of very low production cost, and accordingly can contribute to a reduction in the manufacturing cost of the overtravel detecting device 20.

In the described embodiment, the overtravel detecting device is arranged so as to detect the overtravel of a rotating shaft of a wrist portion of an industrial robot. Nevertheless, the radius "R" of the inner edge 52 of the pattern plate member 22 can be made to suitably fit the rotating shaft of the other movable element of the robot.

Further, the limit switch 32 forming the detecting element of the overtravel detecting device can be easily obtained. The limit switch 32 may be used for constituting an overtravel detecting device mounted on any type of rotating shaft of an industrial robot by using a suitable holding bracket member.

It will easily occur to persons skilled in the art that the overtravel detecting device constituted by the combination of the limit switch attached to a stationary element of an industrial robot and the pattern plate member attached to a rotating element of the industrial robot may be used in a reverse manner such that the limit switch is attached to a rotating element of an industrial robot and the pattern plate member is attached to a stationary element of the industrial robot.

From the foregoing description, it should be understood that, in accordance with the present invention, an overtravel detecting device for mechanically determining and detecting the overtravel of a rotating element or shaft of an industrial robot about an axis of rotation is provided, and that the overtravel detecting device using the pattern plate member provided with spirally extending grooved paths can determine and detect the overtravel of the rotating element during rotation thereof, of which the extent can be larger than one complete revolution, i.e., more than 360 degrees.

Since the limits of rotation of a rotating element of an industrial robot can be set at more than 360 degrees by the overtravel detecting device of the present invention, it is possible to detect the overtravel of a rotating element of a wrist portion of an industrial robot, particularly a multi-articulated industrial robot, in addition to a rotating element of a basic rotating element of the robot such as a robot base and a robot arm. Thus, the overtravel detecting device of the present invention may have a wide utility in comparison with the conventional overtravel detecting device. Further, the overtravel detecting device of the present invention comprised of a combination of a simple pattern plate member and a limit switch can be a product at a low manufacturing cost.

We claim:

1. An overtravel detecting device for detecting a limit of rotation of an industrial robot about an axis of rotation, comprising:

an overtravel indicating means attached to a shaft body having said axis of rotation, and providing detectable ends at predetermined positions about said axis of rotation; and a detecting means arranged at a predetermined position around said shaft body, and provided with a detecting end suitable for coming into contact said detectable ends of said overtravel indicating means, said detecting means transmitting an overtravel signal in response to detection of the limit of rotation;

said overtravel indicating means including a plate member, and being provided with two grooved paths substantially circumferentially extending around said axis of rotation of said shaft body so as to have a predetermined length, respectively, and stop wall portions, one being arranged at an end of each of said two grooved paths so as to function as said detectable ends, said plate member of said overtravel indicating means being integrally rotated with said shaft body to thereby move said detectable ends of said grooved paths relative to said detecting end of said detecting means.

2. An overtravel detecting device for an industrial robot according to claim 1, wherein said two grooved paths of said plate member are formed so as to extend along one common spiral line, and are arranged to form separate inner and outer paths with respect to said axis of rotation of said shaft body.

3. An overtravel detecting device for an industrial robot according to claim 1, wherein said plate member is provided with an innermost circular edge portion by which said plate member is mounted on an outer circumference of said shaft body.

4. An overtravel detecting device for an industrial robot according to claim 1, wherein said predetermined position around said shaft body at which said detecting means is arranged, defines an origin of rotation of said shaft body in two mutually opposite directions.

5. An overtravel detecting device for an industrial robot according to claim 4, wherein said two grooved paths of said plate member have stop walls at ends of said respective paths, said stop walls being arranged so as to come into contact with said detecting end of said detecting means when the rotation of said shaft body in each rotating direction is more than 180 degrees.

6. An overtravel detecting device for an industrial robot according to claim 1, wherein said detecting means is provided with said detecting end at an extreme end of a detecting probe capable of flexing in multiple directions within a space.

7. An overtravel detecting device for an industrial robot according to claim 1, wherein said plate member is made of a circular plate having a central bore portion through which said shaft body is inserted, and is provided with two grooved paths extending spirally around said central bore portion, said two grooved paths having ends with which said detecting end of said detecting means comes into contact in response to the rotation of said shaft body, and portions of said circular plate except for a portion around said two paths being cut away to thereby reduce the weight of said circular plate.

* * * * *